(12) United States Patent
Inoue

(10) Patent No.: US 11,983,304 B2
(45) Date of Patent: May 14, 2024

(54) ON-BOARD SECURE STORAGE SYSTEM FOR DETECTING UNAUTHORIZED ACCESS OR FAILURE AND PERFORMING PREDETERMINED PROCESSING

(71) Applicant: Panasonic Intellectual Property Management Co., Ltd., Osaka (JP)

(72) Inventor: Shinji Inoue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 348 days.

(21) Appl. No.: 17/573,827

(22) Filed: Jan. 12, 2022

(65) Prior Publication Data

US 2022/0138353 A1 May 5, 2022

Related U.S. Application Data

(63) Continuation of application No. PCT/JP2020/025349, filed on Jun. 26, 2020.

(30) Foreign Application Priority Data

Jul. 12, 2019 (JP) ................. 2019-129761

(51) Int. Cl.
*G06F 21/78* (2013.01)
*G06F 3/06* (2006.01)
*G06F 21/31* (2013.01)

(52) U.S. Cl.
CPC ............ *G06F 21/78* (2013.01); *G06F 3/0622* (2013.01); *G06F 3/0659* (2013.01); *G06F 3/0673* (2013.01); *G06F 21/31* (2013.01)

(58) Field of Classification Search
CPC ...... G06F 21/78; G06F 3/0622; G06F 3/0659; G06F 3/0673; G06F 21/31

(Continued)

(56) References Cited

U.S. PATENT DOCUMENTS

2004/0143695 A1 7/2004 Hashimoto et al.
2006/0047374 A1* 3/2006 Hashimoto ............... G06F 1/30
701/1

(Continued)

FOREIGN PATENT DOCUMENTS

CN 112905207 A * 6/2021
CN 115096604 A * 9/2022

(Continued)

OTHER PUBLICATIONS

Cui et al., "A Multilevel Electronic Control Unit Re-Encryption Scheme for Autonomous Vehicles," in IEEE Transactions on Intelligent Transportation Systems, vol. 25, No. 1, pp. 104-119, Jan. 2024, doi: 10.1109/TITS.2023.3309817. (Year: 2023).*

(Continued)

*Primary Examiner* — Peter C Shaw
(74) *Attorney, Agent, or Firm* — Wenderoth, Lind & Ponack, L.L.P.

(57) ABSTRACT

The present disclosure provides an on-board secure storage system capable of easily and quickly detecting unauthorized access to a storage device and a failure of the storage device, and appropriately using the detection result. the on-board secure storage system includes the storage device that has a controller, a non-volatile memory and an interface, and an electronic control unit that electronically controls a vehicle. After determining that unauthorized access or a failure occurs in the non-volatile memory, the controller performs predetermined processing according to the type of the unauthorized access or failure.

18 Claims, 5 Drawing Sheets

(58) Field of Classification Search
USPC .......................................................... 726/26
See application file for complete search history.

(56) References Cited

U.S. PATENT DOCUMENTS

| | | | |
|---|---|---|---|
| 2006/0282550 A1 | 12/2006 | Fujimoto | |
| 2009/0248239 A1* | 10/2009 | Iwaki | B60W 50/02 701/32.7 |
| 2011/0196572 A1* | 8/2011 | Tsuchikiri | B60R 25/00 701/33.4 |
| 2011/0304448 A1* | 12/2011 | Kawamura | G07C 5/0808 340/438 |
| 2014/0073254 A1* | 3/2014 | Ichihara | H04W 76/14 455/41.2 |
| 2014/0115656 A1 | 4/2014 | Kim et al. | |
| 2015/0113311 A1 | 4/2015 | Nakanishi | |
| 2018/0204015 A1 | 7/2018 | Nakamura | |
| 2019/0102114 A1 | 4/2019 | Sela et al. | |
| 2020/0086827 A1 | 3/2020 | Tanaka | |
| 2021/0155270 A1 | 5/2021 | Morita et al. | |

FOREIGN PATENT DOCUMENTS

| | | | | |
|---|---|---|---|---|
| EP | 3 352 088 | | 7/2018 | |
| EP | 3 376 360 | | 9/2018 | |
| JP | 2004-218614 | | 8/2004 | |
| JP | 2006-209744 | | 8/2006 | |
| JP | 2007-310916 | | 11/2007 | |
| JP | 2009-199515 | | 9/2009 | |
| JP | 4345119 B2 | * | 10/2009 | |
| JP | 2011231698 A | * | 11/2011 | |
| JP | 2014-86089 | | 5/2014 | |
| JP | 2015-79402 | | 4/2015 | |
| JP | 2016203719 A | * | 12/2016 | |
| JP | 2018-116510 | | 7/2018 | |
| JP | 2018-194909 | | 12/2018 | |
| JP | 2020035503 A | * | 3/2020 | |
| KR | 20150022329 A | * | 3/2015 | B06W 50/03 |
| KR | 101600460 B | * | 3/2016 | G06F 9/44 |
| WO | 2018/230280 | | 12/2018 | |
| WO | WO-2020188588 A1 | * | 9/2020 | B60R 16/0231 |

OTHER PUBLICATIONS

Zhang et al., "Interactive based Access Control Framework for Connected Vehicle Communication," 2018 IEEE 14th International Conference on Control and Automation (ICCA), Anchorage, AK, USA, 2018, pp. 393-398, doi: 10.1109/ICCA.2018.8444352. (Year: 2018).*
Biswas et al., "State-of-the-Art Review on Recent Advancements on Lateral Control of Autonomous Vehicles," in IEEE Access, vol. 10, pp. 114759-114786, 2022, doi: 10.1109/ACCESS.2022.3217213. (Year: 2022).*
Abueh et al., "Message authentication in driverless cars," 2016 IEEE Symposium on Technologies for Homeland Security (HST), Waltham, MA, USA, 2016, pp. 1-6, doi: 10.1109/THS.2016. 7568882. (Year: 2016).*
Hu et al., "A Software Security Testing Model for Autonomous Systems," 2023 10th International Conference on Dependable Systems and Their Applications (DSA), Tokyo, Japan, 2023, pp. 70-74, doi: 10.1109/DSA59317.2023.00019. (Year: 2023).*
Extended European Search Report issued in Jul. 18, 2022 in corresponding European Patent Application No. 20840625.6.
Japanese Office Action issued Dec. 6, 2022 in corresponding Japanese Patent Application No. 2021-532763, with English translation.
International Preliminary Report on Patentability issued on Jan. 27, 2022, in International (PCT) Patent Application No. PCT/JP2020/025349.
International Search Report issued Aug. 25, 2020 in International (PCT) Application No. PCT/JP2020/025349.

* cited by examiner

Fig.5

| | TYPE OF UNAUTHORIZED ACCESS AND FAILURE | EXPLANATION (DEFINITION) | CONTENT(S) |
|---|---|---|---|
| 1 | ACCESS AREA VIOLATION | ACCESS FROM HOST TO AREA FOR WHICH ACCESS IS NOT PERMITTED | AREA ID OR START ADDRESS IN OPERATION IS INCORRECT |
| 2 | ACCESS MODE VIOLATION | ACCESS INCLUDING COMMAND OTHER THAN EXECUTABLE OPERATION TO AREA IN WHICH EXECUTABLE OPERATION IS LIMITED | OPERATION AREA ID, OR START ADDRESS IS INCORRECT |
| 3 | UNAUTHORIZED DATA ALTERATION | CASE WHERE UNAUTHORIZED DATA ALTERATION IS MADE ON SPECIFIC AREA | OPERATION IS DETERMINED TO BE ALTERATION BY THE DATA CHECKING |
| 4 | UNAUTHORIZED WRITING | CASE WHERE UNAUTHORIZED WRITING OCCURS IN SPECIFIC AREA | ATTRIBUTE AND CONTENT OF WRITTEN DATA ARE NOT PREDETERMINED ATTRIBUTE AND CONTENT |
| 5 | OUT-OF-AREA WRITE ACCESS | ACCESS TO OUT-OF-AREA SET FOR DESIGNATED AREA ID | EVEN THOUGH ADDRESS OF CERTAIN AREA IS DEFINED, WRITE OPERATION FOR THAT AREA DESIGNATES OUT-OF-DEFINITION |
| 6 | SUCCESSIVE ACCESS MODE VIOLATION | CASE WHERE ACCESS OF ACCESS MODE VIOLATION IS PERFORMED PREDETERMINED NUMBER OF TIMES OR MORE | CASE WHERE PROCESSING OF WRITING PREDETERMINED DATA TO PREDETERMINED ADDRESS DESIGNATED IN ADVANCE AS READ-ONLY IS DETECTED PREDETERMINED NUMBER OF TIMES IN SUCCESSION |
| 7 | UNAUTHORIZED ACCESS TO AREA FOR AUTONOMOUS DRIVING | CASE WHERE UNAUTHORIZED ACCESS TO AREA FOR AUTONOMOUS DRIVING IS DETECTED | WRITE OPERATION IS AIMED FOR AREA FOR AUTONOMOUS DRIVING AND IS PERFORMED FROM APPLICATION OTHER THAN APPLICATION TO WHICH ACCESS IS PERMITTED |
| 8 | DETECTION OF FATAL FAULT | CASE WHERE FAULT IS DETERMINED THAT AUTOMATIC RECOVERY IN THE ON-BOARD SECURE STORAGE SYSTEM WITH RESPECT TO FAULT IS NOT POSSIBLE | IN STEP OF FAILURE CHECK, RECOVERY IS IMPOSSIBLE EVEN THOUGH RECOVERY IS ATTEMPTED |
| 9 | DETECTION OF AREA ABNORMALITY | CASE WHERE CARD CONTROLLER DETERMINES THAT AREA ABNORMALITY HAS OCCURRED BY DETECTION OF DATA DESTRUCTION, HW ERROR, OR THE LIKE | FAILURE DETECTION BY FAILURE CHECK |
| 10 | DETECTION OF PARTIAL FATAL FAULT | CASE WHERE FAULT IS FAULT RELATED TO SPECIFIC AREA RELATED TO SPECIFIC FUNCTION OF NON-VOLATILE MEMORY AMONG "FATAL FAULTS" | [1] CASE WHERE FATAL FAULT OCCURS IN AREA OTHER THAN AREA USED BY ON-BOARD NAVIGATION SYSTEM IN STORAGE DEVICE [2] CASE WHERE FATAL FAULT OCCURS IN AREA USED BY ON-BOARD NAVIGATION SYSTEM IN STORAGE DEVICE [3] CASE WHERE FATAL FAULT OCCURS IN AREA USED BY ADAS IN STORAGE DEVICE |

ON-BOARD SECURE STORAGE SYSTEM FOR DETECTING UNAUTHORIZED ACCESS OR FAILURE AND PERFORMING PREDETERMINED PROCESSING

CROSS REFERENCE TO RELATED APPLICATION(S)

This is a continuation application of International Application No. PCT/JP2020/025349, with an international filing date of Jun. 26, 2020, which claims priority of Japanese Patent Application No. 2019-129761 filed on Jul. 12, 2019, each of the contents of which is incorporated herein by reference.

BACKGROUND

1. Technical Field

The present disclosure relates to an on-board secure storage system that performs data transfer between a host device and a storage device. However, the storage device is not limited to being soldered and connected to the host device, and may be mounted via a socket or connected via a cable.

2. Related Art

In the field of on-board systems, currently, a large number of electronic control units (ECUs) mounted on one vehicle are being integrated. When a large number of ECUs are integrated, storage connected to individual ECUs also needs to be integrated.

An SSD or an SD card using a non-volatile memory is mainly used for storage in the field of on-board systems. A technique related to an SD card and an SD card-compatible host is disclosed in JP 2006-209744 A, for example. In ECUs, PCI Express (registered trademark: hereinafter referred to as PCIe) is currently used as a high-speed serial interface.

SUMMARY

An object of the present disclosure is to provide an on-board secure storage system capable of easily and quickly detecting unauthorized access to a storage device and a failure of the storage device, and appropriately using the detection result.

An on-board secure storage system of the present disclosure is an on-board secure storage system including a storage device that has a controller, a non-volatile memory, and an interface, and an electronic control unit that electronically controls a vehicle. After determining that unauthorized access or a failure occurs in the non-volatile memory, the controller performs predetermined processing according to the type of the unauthorized access or failure.

By using the on-board secure storage system of the present disclosure, unauthorized access to the storage device and a failure of the storage device can be easily and quickly detected, and the detection result can be used appropriately.

BRIEF DESCRIPTION OF DRAWINGS

FIG. 5 is a table of types, definitions, and contents of unauthorized access and failure.

DETAILED DESCRIPTION OF INVENTION

Figure 1:
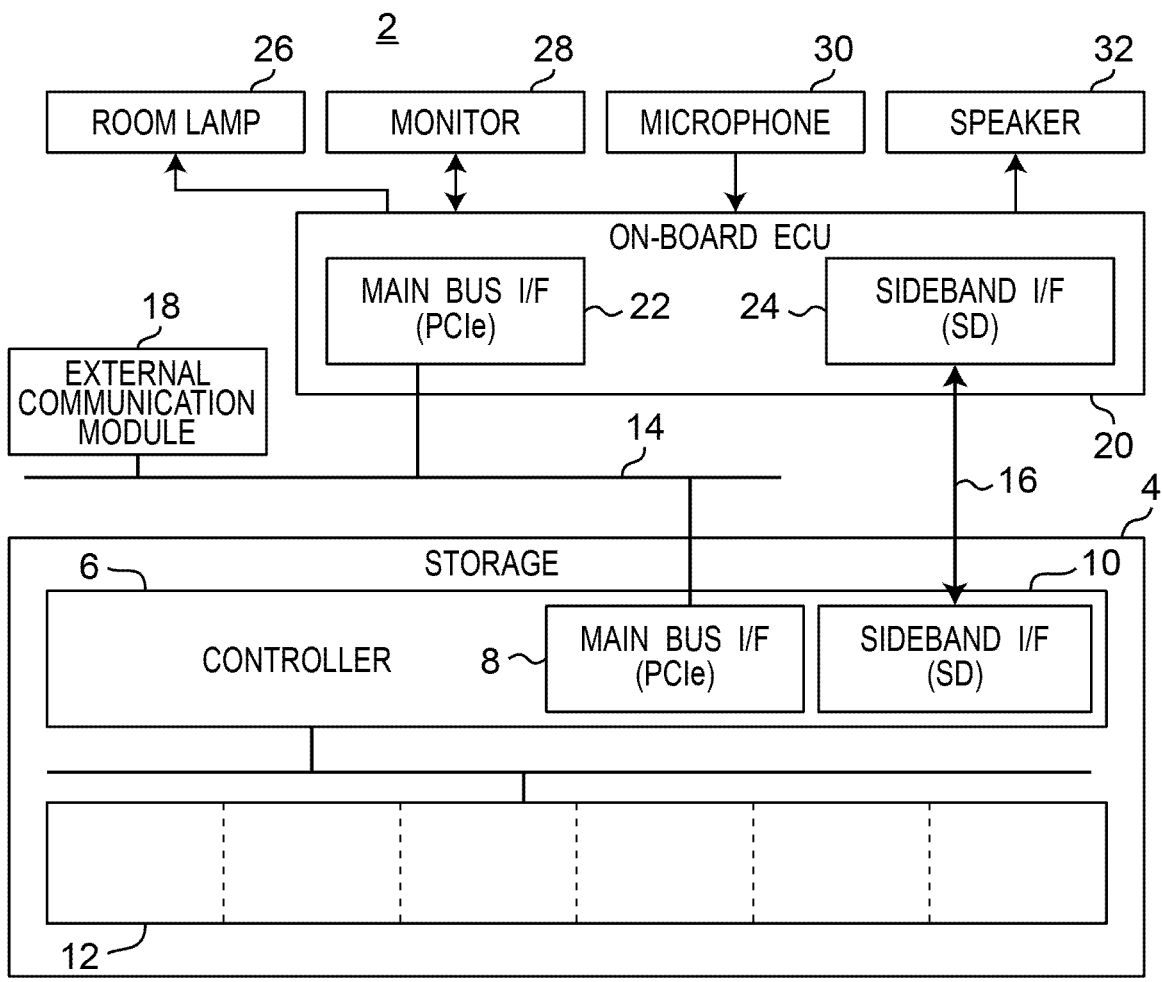
FIG. 1 is a block diagram of an on-board secure storage system according to embodiment 1.

Hereinafter, embodiments will be described in detail with reference to the drawings appropriately. Note however that more detailed description than necessary may be omitted. For example, detailed description of already well-known matters and duplicated description for substantially the same configuration may be omitted. This is for the purpose of preventing the following description from becoming unnecessarily redundant, to thereby facilitate the understanding of those skilled in the art.

The inventor(s) provides the accompanying drawings and the following description in order to allow those skilled in the art to fully understand the present disclosure, but do not intend to limit thereby the subject matters defined in the claims.

Background of Present Disclosure

Conventionally, in an on-board storage system, a driver or a controller on the side of an ECU which is a host device performs checking and detection of unauthorized access, unauthorized writing, and unauthorized processing (unauthorized acts) such as unauthorized alteration made to a storage device. Similarly, the driver or the controller of the ECU which is the host device also performs checking and detection of a failure in the storage device. As for data alteration, the inside of the storage device is entirely checked to examine the possibility of occurrence of unauthorized alteration, and then an alteration check is actually performed in some cases.

When unauthorized access or the like occurs to the storage device, it is not easy for the host device to accurately identify the area or the address where the unauthorized access or the like has occurred, and it takes a predetermined time to identify the area or the address. In particular, regarding the above-described data alteration, it takes time and cost to check the entire inside of the storage device, and to actually perform an alteration check after examining the possibility of alteration. With this configuration, the host device can perform the actual detection only after the lapse of a certain time from the unauthorized access or the unauthorized alteration made to the storage device, and the influence of the unauthorized act or the failure is likely to increase.

The inventor has developed an on-board secure storage system according to the present disclosure that solves the above-described problem. The on-board secure storage system according to the present disclosure generally performs checking and detection of unauthorized processing (unauthorized act) performed on the storage device and checking and detection of a failure in the storage device by itself (i.e., by the storage device).

Hence, in the on-board secure storage system according to the present disclosure, an area or an address on the storage device where unauthorized access or the like has occurred is easily and quickly identified, and the host device can grasp the failure immediately after the unauthorized access or the like or during occurrence of the unauthorized access or the like. For this reason, the host device takes a measure earlier, and the influence of the unauthorized act or failure is minimized. Furthermore, the host device can also keep the influence of the unauthorized act or the failure from spreading to the outside.

Embodiment 1

Hereinafter, an on-board secure storage system according to embodiment 1 of the present invention will be described with reference to the drawings.

1.1. Configuration of On-Board Secure Storage System

FIG. 1 is a block diagram of an on-board secure storage system 2 according to embodiment 1. The on-board secure storage system 2 illustrated in FIG. 1 is an on-board system.

The on-board secure storage system 2 according to the present embodiment illustrated in FIG. 1 includes an on-board ECU 20 and a storage device 4. The storage device 4 includes a controller 6 and a non-volatile memory 12 including a NAND flash memory or the like, and the controller 6 includes a main bus interface 8 and a sideband interface 10. The on-board ECU 20 also includes a main bus interface 22 and a sideband interface 24.

The on-board secure storage system 2 uses PCIe as a high-speed serial interface, and the main bus interface 22 of the on-board ECU 20 and the main bus interface 8 of the storage device 4 are connected to a PCIe bus 14. Since the PCIe bus 14 is also connected to an external communication module 18 conforming to WiFi (registered trademark) or the like, the on-board secure storage system 2 can perform data communication with, for example, an external cloud storage through the external communication module 18.

The sideband interface 24 of the on-board ECU 20 and the sideband interface 10 of the storage device 4 are connected through a sideband bus (SD bus) 16 to perform data communication.

The non-volatile memory 12 in the storage device 4 is divided into a plurality of logical areas. Furthermore, the non-volatile memory 12 is controlled by the controller 6 with respect to input, output, and storage of data.

The controller 6 in the storage device 4 performs control related to input, output, and storage of data to the non-volatile memory 12. Accordingly, as will be described later, the controller 6 also checks for an unauthorized access to the non-volatile memory 12, and checks for a failure in the non-volatile memory 12. Note that the storage device 4 is an information recording medium such as an SD card.

The on-board secure storage system 2 includes, as peripheral devices, a room lamp 26, a monitor 28, a microphone 30, and a speaker 32, and the on-board ECU 20 is connected to these peripheral devices. The room lamp 26 is an illumination device in the vehicle, and represents a signal or a message to be transmitted to the driver by the on-board ECU 20 in a form such as blinking or color change of the light. The monitor 28 represents the signal or the message to be transmitted to the driver by the on-board ECU 20 in a form of an image. In addition, the driver inputs information to the on-board ECU 20 by a simple operation on a screen of the monitor 28. The speaker 32 represents the signal or the message to be transmitted to the driver by the on-board ECU 20 in a form of a voice. Furthermore, the driver receives the voice from the speaker 32 and inputs information to the on-board ECU 20 by a simple utterance to the microphone 30.

1.2. Operation of On-Board Secure Storage System

[1.2.1. Preprocessing in On-Board Secure Storage System]

Figure 2:
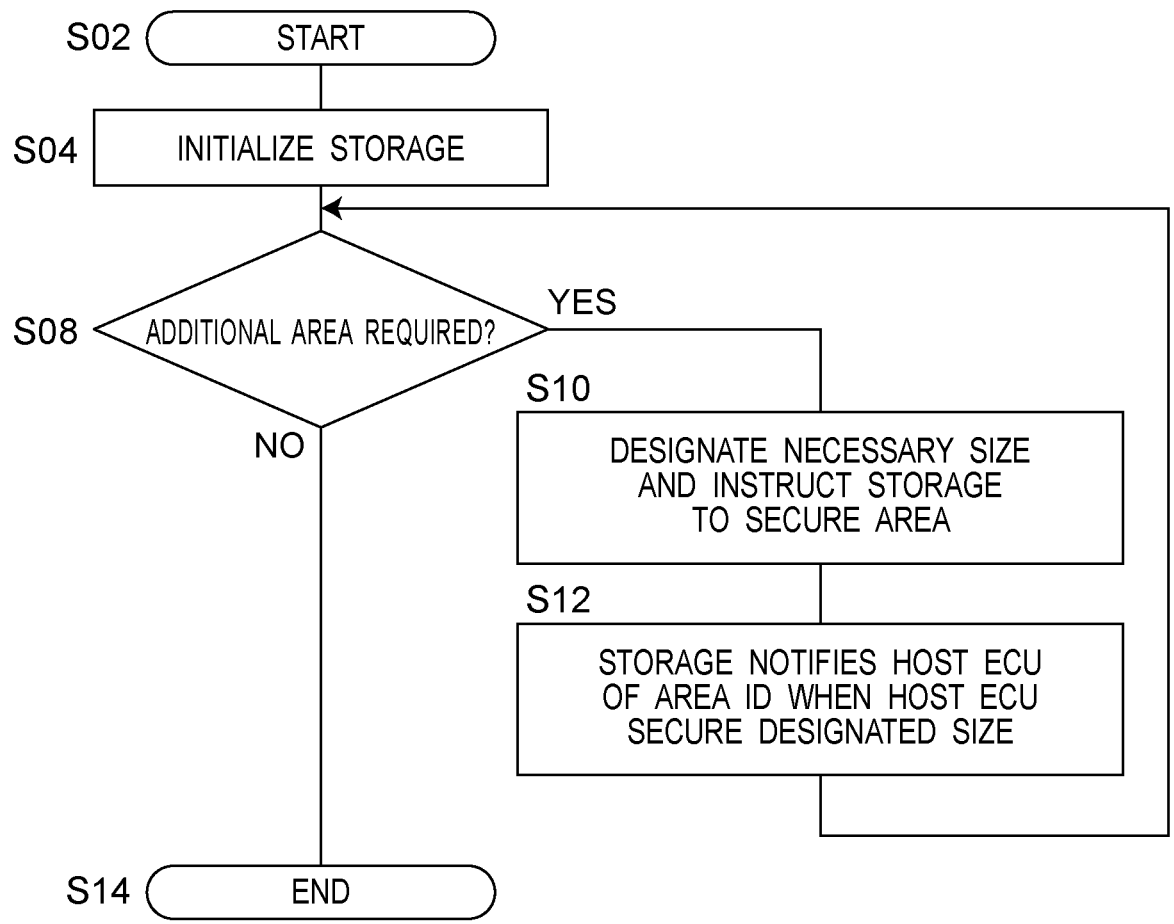
FIG. 2 is a flowchart of preprocessing in the on-board secure storage system according to embodiment 1.

FIG. 2 is a flowchart of preprocessing in the on-board secure storage system 2 according to the present embodiment. Preprocessing is typically started before the on-board secure storage system 2 is shipped (step S02). In the preprocessing, at first, initialization processing of the storage device 4 is performed (step S04). The initialization processing of the storage device 4 includes processing in which the controller 6 creates a logical/physical conversion table indicating a relationship between a physical address of the non-volatile memory 12 and a logical address used for access by on-board ECU which is a host, and stores the logical/physical conversion table in a RAM (not illustrated) in the controller 6.

Next, the on-board ECU 20 determines whether or not to add a logical area to the non-volatile memory 12 (step S08). If a logical area is to be added (step S08: Yes), the host on-board ECU 20 designates a necessary size, and instructs the controller 6 of the storage device 4 to secure an area (step S10). The controller 6 of the storage device 4 secures the designated size, and notifies the host on-board ECU 20 of an area ID of the logical area (step S12).

As long as it is necessary to add a logical area to the non-volatile memory 12 (step S08: Yes), steps S10 and S12 are repeated. When it becomes unnecessary to add a logical area to the non-volatile memory 12 (step S08: No), the logical-physical conversion table stored in the controller 6 is recorded in the non-volatile memory 12, and then the preprocessing ends (step S14).

[1.2.2. Unauthorized Access Check Processing in On-Board Secure Storage System]

Figure 3:
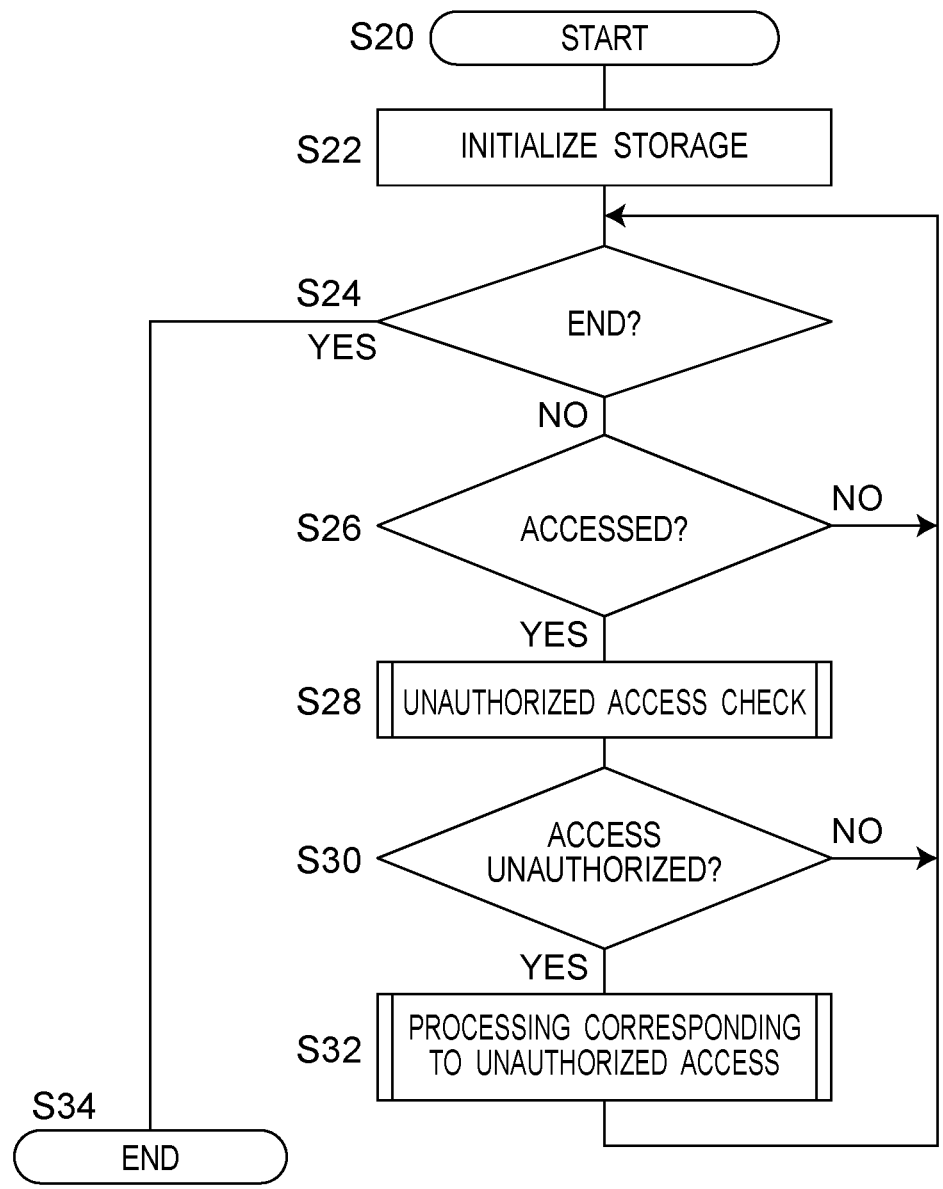
FIG. 3 is a flowchart of basic processing including unauthorized access check processing in the on-board secure storage system according to embodiment 1.

FIG. 3 is a flowchart of basic processing including unauthorized access check processing in the on-board secure storage system 2 according to the present embodiment. When the basic processing is started (step S20), at first, initialization processing of the storage device 4 is performed (step S22). The non-volatile memory 12 in the storage device 4 logically has one or more areas (logical areas), and thus, is set such that control suitable for each area is performed in the initialization processing.

In the basic processing including the unauthorized access check processing, it is repeatedly checked whether or not the basic processing is ended (step S24), and, if not ended (step S24: No), it is repeatedly checked whether or not the storage device 4 is accessed from the on-board ECU 20 (step S26). In step S26, the controller 6 of the storage device 4 checks whether or not a command for accessing the non-volatile memory 12 comes from the on-board ECU 20.

If the storage device 4 is accessed from the on-board ECU 20 in the basic processing (step S26: Yes), the controller 6 of the storage device 4 performs an unauthorized access check by analysis (step S28). If it is determined in the basic processing that there is no unauthorized access (step S30: No), the controller 6 stands by for the next access. If it is determined in the basic processing that there is unauthorized access (step S30: Yes), the controller 6 of the storage device 4 and the on-board ECU 20 perform processing corresponding to the unauthorized access (step S32). Here, details of the "unauthorized access check" (step S28) and the "processing corresponding to unauthorized access" (step S32) will be described later with reference to FIG. 5.

When the basic processing is ended (step S24: Yes), the entire processing is ended (S34).

[1.2.3. Failure Check Processing in On-Board Secure Storage System]

Figure 4:
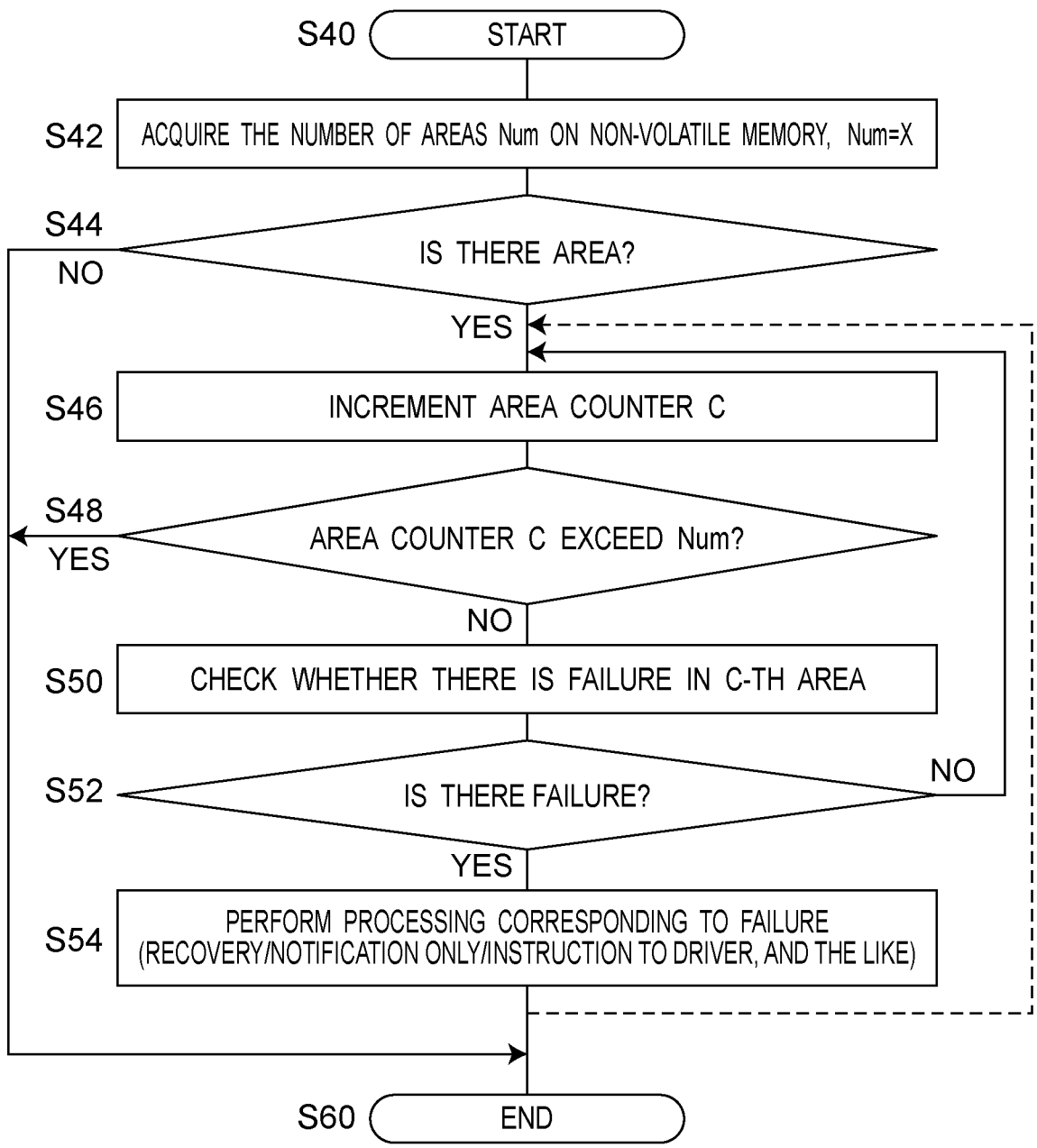
FIG. 4 is a flowchart of failure check processing in the on-board secure storage system according to embodiment 1.

FIG. 4 is a flowchart of failure check processing in the on-board secure storage system 2 according to the present embodiment. The on-board secure storage system 2 performs the unauthorized access check processing illustrated in FIG. 3 during the basic processing. In addition, the on-board secure storage system 2 starts execution of the failure check processing illustrated in FIG. 4 by using an interruption by a timer or access by the host on-board ECU 20 as a trigger (step S40).

First, the controller 6 of the storage device 4 acquires the number of logical areas Num=X on the non-volatile memory 12 (step S42). If there is no logical area (i.e., zero) (step S44: No), the failure check processing ends (step S60). If there is a logical area (step S44: Yes), the controller 6 of the storage device 4 increments an area counter C (step S46). Note that the case where there is no logical area includes a case where the non-volatile memory 12 blocks access from the controller 6. If the area counter C does not exceed Num (the number of logical areas) (step S48: No), the controller 6 of the storage device 4 checks (i.e., examines) whether there is a failure (i.e., abnormality) in the C-th logical area (step S50).

If it is determined in the failure check processing that there is no failure (step S52: No), processing of incrementing the area counter C (step S46) and subsequent processing are repeated. If it is determined in the failure check processing that there is a failure (step S52: Yes), processing corresponding to the failure is performed (step S54). The processing corresponding to the failure includes recovery, notification, instruction to the driver, and the like.

After step S54, the failure check processing may directly proceed to the end (step S60). Alternatively, after step S54, as indicated by a dashed line and an arrow in the flowchart of FIG. 4, the failure check processing may return to immediately before the processing (step S46) of incrementing the area counter C. In this case, the processing (step S46) of incrementing the area counter C and subsequent processing are repeated in the failure check processing. Hence, the processing of checking whether there is a failure (step S50), and if it is determined that there is a failure (step S52: Yes), processing corresponding to the problem (step S54), are performed for all the areas.

When the area counter C exceeds Num (the number of logical areas) (step S48: Yes), the failure check processing ends (step S60).

[1.2.4. Types of Unauthorized Access and Failure Checking and Corresponding Processing]

Specific types of the unauthorized access and failure checking whose flow of processing have been illustrated with reference to FIGS. 3 and 4, and specific operations of processing corresponding thereto will be described with reference to a table in FIG. 5. Note that the types of unauthorized access and failure checking and the operation of corresponding processing described below are merely examples, and are not limited to the following.

[1.2.4.0. Premise]

In describing the specific types of the unauthorized access and failure checking and specific operations of processing corresponding thereto, at first, contents of a table holding information regarding the host for each area of the non-volatile memory 12 in the controller 6 will be described.

For each area of the non-volatile memory 12, the controller 6 holds the table defining:
(1) the accessible host;
(2) operations available if the host is capable of accessing the area (write operation, read operation, copy operation, move operation, and erase operation);
(3) information indicating whether or not another area is addable as a writable area when out-of-area access occurs;
(4) information indicating whether or not the area records data related to autonomous driving (area for autonomous driving); and
(5) information indicating an attribute of an accessible application (application ID).

[1.2.4.1. Access Area Violation]

A first type of unauthorized access is "Access area violation". "Access area violation" is defined as access from a host to an area for which access is not permitted. An example of the content is that an area ID or a start address in an operation from the host is incorrect. The controller 6 detects the presence or absence of access area violation by comparing the area of the non-volatile memory 12 represented by the area ID or the start address targeted by the operation with the host issuing the command.

When access area violation occurs, the controller 6 of the storage device 4 takes a measure of prohibiting access from all the corresponding hosts including the permitted areas. Note that the measure is not limited to the content described above. For example, the controller 6 of the storage device 4 may be configured to prohibit only access for a write operation from the host that has committed the access area violation.

When access area violation occurs, the controller 6 of the storage device 4 notifies the host in the form of an operation error.

[1.2.4.2. Access Mode Violation]

A second type of unauthorized access is "Access mode violation". "Access mode violation" is defined as access including a command other than an executable operation to an area in which the executable operation is limited. An example of the content is that an operation, which is a command from the host, an area ID, or a start address is incorrect.

When access mode violation occurs, the controller 6 of the storage device 4 takes a measure of prohibiting the operation. Furthermore, when similar accesses continue, the controller 6 of the storage device 4 takes a measure of temporarily disabling access to the area, and in addition, notifying the host of the content of the access mode violation to request the host side to take action. The host requested to take action identifies the application performing the access based on the content of the access mode violation, and performs processing such as limiting the operation of the application.

The controller 6 of the storage device 4 notifies the host in the form of an operation error.

[1.2.4.3. Unauthorized Data Alteration]

A third type of unauthorized access is "Unauthorized data alteration". "Unauthorized data alteration" is defined as a case where unauthorized data alteration is made on a specific area. Here, a data checking method is stored in advance in the controller 6 of the storage device 4. The content of "unauthorized data alteration" is that an operation is determined to be alteration by the data checking method stored in advance.

The controller 6 of the storage device 4 takes a measure of protecting current data on the non-volatile memory 12, notifying the host of the access, and requesting the host to recheck the data.

The controller 6 of the storage device 4 notifies the host in the form of a command error or in the form of an interrupt.

[1.2.4.4. Unauthorized Writing]

A fourth type of unauthorized access is "Unauthorized writing". "Unauthorized writing" is defined as a case where unauthorized writing occurs in a specific area. Here, a predetermined attribute and content (address, data type, and the like) of the write data are stored in advance in the controller 6 of the storage device 4 for each area of the non-volatile memory 12. The content of "unauthorized writing" is that an attribute and a content of write data are not the predetermined attribute and content stored in advance.

When unauthorized writing occurs, the controller 6 of the storage device 4 takes a measure of assigning a reference sign to the written data, setting an area in which the data is written as a read-only area, and further setting the area as the read-only area until a cancellation command is later issued from the host, as an example of a measure. The reference sign is assigned to the written data in order to make it easy for the host to find the data afterward, for example.

The controller 6 of the storage device 4 notifies the host of an operation error in the form of a response to an operation or in the form of an interrupt.

[1.2.4.5. Out-of-Area Write Access]

A fifth type of unauthorized access is "Out-of-area write access". "Out-of-area write access" is defined as access to the outside of an area set for a designated area ID. An example of the content is a case where a write operation for an area ID1 starts from address 2001 even though the address of the area ID1 is defined to be address 0 to address 2000, for example.

When out-of-area write access occurs and information indicating whether or not another area is addable as a writable area at the time of out-of-area write access that the another area is "addable", the controller 6 of the storage device 4 takes a measure of automatically securing a new area in the non-volatile memory and adding the new area as a continuous area.

The controller 6 of the storage device 4 notifies the host of the expansion of the area.

[1.2.4.6. Successive Access Mode Violation]

A sixth type of unauthorized access is "Successive access mode violation". "Successive access mode violation" is defined as a case where access of access mode violation is performed a predetermined number of times or more. An example of successive access mode violation is a case where processing of writing predetermined data to a predetermined address designated in advance as read-only is detected a predetermined number of times in succession.

When successive access mode violation occurs, the controller 6 of the storage device 4 takes a measure of temporarily canceling the read-only mode, enabling writing until predetermined data is written to a predetermined address, and returning the mode to the read-only mode when the predetermined data is written to the predetermined address. In other words, the controller 6 switches the access mode using the access mode violation. Whether or not to enable such a measure may be determined for each area, or such a measure may be enabled for the entire area.

The controller 6 of the storage device 4 notifies the host of the success or failure of the measure by a command response.

[1.2.4.7. Unauthorized Access to Area for Autonomous Driving]

A seventh type of unauthorized access is "Unauthorized access to an area for autonomous driving". "Unauthorized access to an area for autonomous driving" is defined as a case where unauthorized access to an area for autonomous driving is detected. An example of the content is that a write operation is aimed for an area for autonomous driving and is performed from an application other than an application (e.g., autonomous driving program update application) to which access is permitted.

When unauthorized access to an area for autonomous driving occurs, the controller 6 of the storage device 4 performs processing of invalidating a part or all of the area for autonomous driving or stopping or partially limiting the function of the autonomous driving. Furthermore, the controller 6 of the storage device 4 takes a measure of notifying the host of the stoppage of the autonomous driving or the limiting of some functions. In response to this, the on-board ECU 20 stops the autonomous driving or limits some functions.

The controller 6 of the storage device 4 notifies the host in the form of an interrupt.

[1.2.4.8. Detection of Fatal Fault]

A type of a first failure (abnormality) detected in step S52 is "Detection of a fatal fault". "Detection of a fatal fault" is defined as detection of a fault in which a fatal error occurs in each area and it is determined that automatic recovery in the storage is not possible, that is, detection of a fault in which it is determined that automatic recovery in the on-board secure storage system is not possible. An example of the content is that, in step S54 of the failure check (see FIG. 4), recovery is impossible even though recovery is attempted.

When a fatal fault is detected, the controller 6 of the storage device 4 completely or partially interrupts access from the host to the non-volatile memory 12 and notifies the host of the occurrence of the fatal fault. In response to this, the host on-board ECU 20 notifies an external service center by an external communication function of the external communication module 18.

The controller 6 of the storage device 4 notifies the host of an operation error in the form of a response or in the form of an interrupt.

[1.2.4.9. Detection of Area Abnormality]

A second failure (abnormality) detected in step S52 is "Detection of an area abnormality". "Detection of an area abnormality" is defined as a case where the controller 6 determines that an area abnormality has occurred by detection of data destruction, a hardware error, or the like. The content is failure detection by a failure check (see FIG. 4).

When an area abnormality is detected, the controller 6 performs any one or all of the following processes as the processing of step S54.

[1] The controller 6 of the storage device 4 issues an instruction to switch to a backup area of the corresponding area. This backup area is prepared in advance. The controller 6 of the storage device 4 notifies the host on-board ECU 20 of the switching.

The controller 6 of the storage device 4 notifies the host that the measure of area switching has been taken in the form of an interrupt or the like.

[2] The controller 6 of the storage device 4 may perform recovery of a broken volume. This recovery is performed using a RAID configured in advance. The controller 6 of the storage device 4 notifies the host on-board ECU 20 of the recovery.

The controller 6 of the storage device 4 notifies the host that recovery has been performed as a measure in the form of an interrupt or the like.

[3] The controller 6 of the storage device 4 may automatically record data in a distributed manner in the non-volatile memory 12, and then automatically recover a failed area from another area. The controller 6 of the storage device 4 notifies the host on-board ECU 20 that the data is automatically recorded in a distributed manner and that the failed area is automatically recovered from another area. Note that a secret distribution technique may be used when data is automatically recorded in a distributed manner in the non-volatile memory 12.

The controller 6 of the storage device 4 notifies the host that the distributed recording and recovery of data have been performed as a measure in the form of an interrupt or the like.

[4] Furthermore, the controller 6 of the storage device 4 may perform recovery by downloading data of the failed area from a server of an external service center by the external communication function of the external communication module 18. The controller 6 of the storage device 4 notifies the host on-board ECU 20 of the recovery.

The controller 6 of the storage device 4 notifies the host that recovery has been performed as a measure in the form of an interrupt or the like.

[1.2.4.10. Detection of Partial Fatal Fault]

A third failure (abnormality) detected in step S52 is "Detection of a partial fatal fault". "Detection of a partial fatal fault" is defined as a case of "detection of a fatal fault" where a fatal error occurs in a specific area and automatic recovery in the storage cannot be performed. That is, "detection of a partial fatal fault" which is the third failure (abnormality) is detection of a fault related to a specific area related to a specific function of the non-volatile memory among the fatal faults which are targets of the first failure (abnormality).

The content of the detection of a partial fatal fault and the processing in step S54 performed by the controller 6 when the detection of the partial fatal fault occurs are one or all of the following.

[1] When a fatal fault occurs in an area other than the area used by the on-board navigation system in the storage device 4, the controller 6 of the storage device 4 notifies the host on-board ECU 20 that the usable function is a function related to navigation. In response to this, the host on-board ECU 20 displays a guidance to the nearest repair shop on the monitor 28 and guides the vehicle 1 to the repair shop. Furthermore, the controller 6 of the storage device 4 requests the on-board ECU 20 to notify an external service center by the external communication function of the external communication module 18.

The controller 6 of the storage device 4 notifies the host in the form of an interrupt.

[2] When a fatal fault occurs in an area used by the on-board navigation system in the storage device 4, the controller 6 of the storage device 4 notifies the host on-board ECU 20 that a fatal fault has occurred in the area used by the on-board navigation system. In response to this, the host on-board ECU 20 reads navigation information to the nearest repair shop from the backup area in the non-volatile memory 12, displays the navigation information on the monitor 28, and guides the vehicle 1 to the repair shop by autonomous driving. Furthermore, the controller 6 of the storage device 4 requests the on-board ECU 20 to notify an external service center by the external communication function of the external communication module 18.

The controller 6 of the storage device 4 notifies the host in the form of an interrupt.

[3] When a fatal fault occurs in an area used by an advanced driver-assistance system (ADAS) in the storage device 4, the controller 6 of the storage device 4 notifies the host on-board ECU 20 that the ADAS cannot be used. In response to this, the host on-board ECU 20 notifies the driver that the ADAS cannot be used by using an image displayed on the monitor 28, voice output from the speaker 32, or blinking, color change, or brightness change of the room lamp 26. Furthermore, the host on-board ECU 20 guides the vehicle 1 to the nearest repair shop by autonomous driving. Alternatively, the host on-board ECU 20 displays a guide to the nearest repair shop on the monitor 28, and guides the vehicle 1 to the nearest repair shop by manual driving. Furthermore, the controller 6 of the storage device 4 requests the on-board ECU 20 to notify an external service center by the external communication function of the external communication module 18.

The controller 6 of the storage device 4 notifies the host in the form of an interrupt.

[1.2.5. Operations of On-Board ECU and Peripheral Devices when On-Board ECU Receives Notification about Unauthorized Access or Failure from Storage Device]

Operations of the on-board ECU 20 and the peripheral devices when the on-board ECU 20 receives a notification about unauthorized access or failure from the storage device 4 will be described.

[1.2.5.1. Operation of Monitor]

An operation of the monitor 28 will be described. The monitor 28 displays an attention or warning to the driver by using character information, an icon, or the like according to an instruction from the on-board ECU 20. The monitor 28 also displays whether or not an emergency response by the driver is required, and advice regarding the operation and action of the driver.

The monitor 28 may switch the color and brightness of the screen according to the content of the information to be displayed.

When the on-board system including the storage device 4 needs to be repaired, the monitor 28 may display a screen for guiding to the nearest repair work execution facility such as a repair shop according to the on-board navigation system. The monitor 28 may also display, on a screen of the on-board navigation system, an instruction to call a road service provider, an automobile dealer, a service center, or the like.

The monitor 28 may accept an input by the driver through an operation with respect to the screen. The input by the driver is, for example, an instruction of the driver regarding a warning or attention displayed on the screen. For example, the driver inputs "go to repair shop immediately" through the screen of the monitor 28 in response to a warning screen of occurrence of a failure. Alternatively, for example, the driver inputs "go to repair shop at a later date" through the screen of the monitor 28 in response to a caution screen of occurrence of a failure.

[1.2.5.2. Operation of Speaker and Microphone]

Operations of the speaker 32 and the microphone 30 will be described. The speaker 32 notifies the driver of information to be displayed on the monitor 28 by speech. The speaker 32 preferably notifies the driver of information in a designated language. Furthermore, the speaker 32 is preferably configured such that the designated language is selected from a plurality of languages.

The microphone 30 may accept an input by a driver's voice. Here, the input by the driver's voice is, for example, an instruction of the driver regarding the information notified to the driver by the speaker 32. For example, the driver audio-inputs "go to repair shop immediately" through the microphone 30 in response to audio information of a warning of occurrence of a failure.

Alternatively, for example, the driver audio-inputs "go to repair shop at a later date" through the microphone 30 in response to audio information of a caution about occurrence of a failure.

[1.2.5.3. Operation of Room Lamp]

An operation of the room lamp 26 will be described. For a driver who is not good at perceiving by hearing, the room lamp 26 notifies attention or warning by blinking, color change, or brightness change of the light. The room lamp 26 may be configured to change the color, change the blinking interval, or change brightness depending on the location or content of a fault. As a result, the driver can recognize the content of the unauthorized access or the failure and use the content as a guideline for selecting a specific driving operation or action thereafter.

1.3. Summary

The on-board secure storage system 2 according to the present embodiment is the on-board secure storage system 2 including the storage device 4 that has the controller 6, the non-volatile memory 12 and the interface (8, 10), and the electronic control unit 20 that electronically controls the vehicle 1. After determining that unauthorized access or a failure occurs in the non-volatile memory 12, the controller 6 performs predetermined processing according to the type of the unauthorized access or failure.

With this configuration, the on-board secure storage system 2 can easily and quickly detect unauthorized access to the storage device 4 or a failure of the storage device 4, and can appropriately use the detection result.

Furthermore, in the on-board secure storage system 2 according to the present embodiment, the controller 6 analyzes a command received from the electronic control unit 20, and if it is determined as a result of the analysis that the command for the non-volatile memory 12 is unauthorized access, the controller 6 performs predetermined processing corresponding to the unauthorized access.

With this configuration, the on-board secure storage system 2 can easily and quickly detect unauthorized access to the storage device 4, and can appropriately use the detection result.

Further, in the on-board secure storage system 2 according to the present embodiment, the non-volatile memory 12 is divided into a plurality of logical areas. The controller 6 checks the presence or absence of a failure for each of the plurality of logical areas using an interruption by a timer or communication from the electronic control unit 20 as a trigger, and if it is determined as a result of the checking that there is a failure, performs predetermined processing corresponding to the failure.

With this configuration, the on-board secure storage system 2 can easily and quickly detect a failure of the storage device 4, and can appropriately use the detection result.

Furthermore, in the on-board secure storage system 2 according to the present embodiment, the predetermined processing corresponding to unauthorized access and predetermined processing corresponding to a failure include notifications to the electronic control unit.

With this configuration, the on-board secure storage system 2 can appropriately use the detection result of unauthorized access to the storage device 4 or a failure of the storage device 4.

Furthermore, in the on-board secure storage system 2 according to the present embodiment, the type of unauthorized access is any one of access area violation, access mode violation, unauthorized data alteration, unauthorized writing, out-of-area write access, successive access mode violation, and unauthorized access to an area for autonomous driving.

With this configuration, the on-board secure storage system 2 can easily and quickly detect unauthorized access to the storage device 4.

Furthermore, in the on-board secure storage system 2 according to the present embodiment, unauthorized access is access area violation, and predetermined processing corresponding to the unauthorized access includes prohibiting all access from the electronic control unit.

With this configuration, the on-board secure storage system 2 can appropriately use the detection result of unauthorized access to the storage device 4.

Furthermore, in the on-board secure storage system 2 according to the present embodiment, unauthorized access is access mode violation, and predetermined processing corresponding to the unauthorized access includes prohibiting an operation corresponding to the access mode.

With this configuration, the on-board secure storage system 2 can appropriately use the detection result of unauthorized access to the storage device 4.

Furthermore, in the on-board secure storage system 2 according to the present embodiment, unauthorized access is unauthorized data alteration, and predetermined processing corresponding to the unauthorized access includes protecting current data on the non-volatile memory 12, notifying the electronic control unit 20 of the occurrence of the unauthorized access, and requesting the electronic control unit 20 to recheck the data.

With this configuration, the on-board secure storage system 2 can appropriately use the detection result of unauthorized access to the storage device 4.

Furthermore, in the on-board secure storage system 2 according to the present embodiment, unauthorized access is unauthorized writing, and predetermined processing corresponding to the unauthorized access includes assigning a reference sign to written data, setting an area in which the data is written as a read-only area, and setting the area as the read-only area until a cancellation command is issued from the host later.

With this configuration, the on-board secure storage system 2 can appropriately use the detection result of unauthorized access to the storage device 4.

Furthermore, in the on-board secure storage system 2 according to the present embodiment, when out-of-area write access occurs and information indicating whether or not another area is addable as a writable area at the time of out-of-area write access indicates that the another area is addable, unauthorized access is out-of-area write access, and predetermined processing corresponding to the unauthorized access includes automatically securing a new area in the non-volatile memory 12 and adding the new area as a continuous area.

With this configuration, the on-board secure storage system 2 can appropriately use the detection result of unauthorized access to the storage device 4.

Furthermore, in the on-board secure storage system 2 according to the present embodiment, unauthorized access is successive access mode violation, and predetermined processing corresponding to the unauthorized access includes temporarily canceling the read-only mode, enabling writing until predetermined data is written to a predetermined address, and returning the mode to the read-only mode when the predetermined data is written to the predetermined address.

With this configuration, the on-board secure storage system 2 can appropriately use the detection result of unauthorized access to the storage device 4.

Furthermore, in the on-board secure storage system 2 according to the present embodiment, unauthorized access is unauthorized access to an automatic operation area, and predetermined processing corresponding to the unauthorized access includes invalidating a part or all of the area for autonomous driving, or performing processing of stopping or partially limiting the function of the autonomous driving, and further notifying the host of stoppage of the autonomous driving or partial limitation of the function.

With this configuration, the on-board secure storage system 2 can appropriately use the detection result of unauthorized access to the storage device 4.

Furthermore, in the on-board secure storage system 2 according to the present embodiment, the failure type is any of detection of a fatal fault that is a fault in which it is determined that automatic recovery in the on-board secure storage system is impossible, detection of an area abnormality, and detection of a fault related to a specific area related to a specific function of the non-volatile memory among the fatal faults.

With this configuration, the on-board secure storage system 2 can easily and quickly detect a failure of the storage device 4.

Furthermore, in the on-board secure storage system 2 according to the present embodiment, the failure is detection of a fatal fault described above, and predetermined processing corresponding to the failure includes completely or partially interrupting access from the host to the non-volatile memory 12.

With this configuration, the on-board secure storage system 2 can appropriately use the detection result of a failure of the storage device 4.

Furthermore, in the on-board secure storage system 2 according to the present embodiment, the failure is detection of an area abnormality, and predetermined processing corresponding to the failure includes switching to a backup area of the corresponding area.

With this configuration, the on-board secure storage system 2 can appropriately use the detection result of a failure of the storage device 4.

Furthermore, in the on-board secure storage system 2 according to the present embodiment, the failure is detection of the fault related to the specific area related to the specific function of the non-volatile memory among the fatal faults described above, and predetermined processing corresponding to the failure includes requesting the electronic control unit 20 to notify an external service center by external communication.

With this configuration, the on-board secure storage system 2 can appropriately use the detection result of a failure of the storage device 4.

Furthermore, in the on-board secure storage system 2 according to the present embodiment, the electronic control unit 20 is connected to the monitor 28. Upon receiving the notification, the electronic control unit 20 displays a caution or a warning on the screen of the monitor 28.

With this configuration, the on-board secure storage system 2 can appropriately use the detection result regarding unauthorized access to the storage device 4 or a failure of the storage device 4.

Furthermore, in the on-board secure storage system 2 according to the present embodiment, the electronic control unit 20 is connected to the speaker 32 and the microphone 30. Upon receiving the notification, the electronic control unit 20 causes the speaker 32 to vocalize information related to the caution or warning, and accepts an input by voice via the microphone 30.

With this configuration, the on-board secure storage system 2 can appropriately use the detection result regarding unauthorized access to the storage device 4 or a failure of the storage device 4.

Furthermore, in the on-board secure storage system 2 according to the present embodiment, the electronic control unit 20 is connected to the room lamp 26. Upon receiving the notification, the electronic control unit 20 performs blinking, color change, or brightness change of the room lamp 26.

With this configuration, the on-board secure storage system 2 can appropriately use the detection result regarding unauthorized access to the storage device 4 or a failure of the storage device 4.

OTHER EMBODIMENTS

As described above, embodiment 1 has been described as an example of the technique disclosed in the present application. However, the technique in the present disclosure is not limited thereto, and can also be applied to exemplary embodiments in which changes, replacements, additions, omissions, and the like are made as appropriate. For example, while the non-volatile memory 12 is divided into a plurality of logical areas in the present embodiment, the non-volatile memory 12 does not necessarily have to be divided. That is, the non-volatile memory 12 may be configured of only a single logical area. The connection among the main bus interface 8, the external communication module 18, and/or the main bus interface 22 may be a network connection using Ethernet (registered trademark) or the like instead of a bus connection using PCIe or the like. While the notification from the controller 6 to the host is performed in the form of a response to an operation or an interrupt in the present embodiment, the method of information exchange between the controller and the host is not limited thereto. That is, instead of notifying the host by the controller 6, the contents to be notified may be described as a log in a predetermined area in the non-volatile memory 12, and the host may read the predetermined area by itself so that the host can detect unauthorized access, data alteration caused by unauthorized access, and a failure of the system. With this configuration, the on-board secure storage system 2 can appropriately use the detection result regarding unauthorized access to the storage device 4 or a failure of the storage device.

The accompanying drawings and the detailed description have been provided in order to describe the embodiment. Accordingly, the components described in the accompanying drawings and the detailed description may include not only components essential for solving the problem but also components that are not essential for solving the problem in order to illustrate the above technique. Hence, it should not be immediately recognized that these non-essential components are essential based on the fact that these non-essential components are described in the accompanying drawings and the detailed description.

Since the above-described embodiment is intended to illustrate the technique of the present disclosure, various changes, replacements, additions, omissions, and the like can be made within the scope of the claims or equivalents thereof.

The present invention can be used in an on-board storage system, particularly an on-board storage system in an automobile equipped with an autonomous driving system.

What is claimed is:

1. An on-board secure storage system comprising a storage device that has a controller, a non-volatile memory, and an interface, and an electronic control unit that electronically controls a vehicle, wherein, after determining that unauthorized access or a failure occurs in the non-volatile memory, the controller performs predetermined processing according to a type of the unauthorized access or the failure, wherein the predetermined processing includes recording and marking the notification in the non-volatile memory to be readable and accessible only by the electronic control unit; and wherein the type of the unauthorized access is selected from: access area violation, unauthorized data alteration, unauthorized writing, out-of-area write access, successive access mode violation, and unauthorized access to an area for autonomous driving.

2. The on-board secure storage system as claimed in claim 1, wherein the controller analyzes a command received from the electronic control unit, and if it is determined as a result of the analysis that the command for the non-volatile memory is unauthorized access, the controller performs predetermined processing corresponding to the unauthorized access.

3. The on-board secure storage system as claimed in claim 1, wherein the non-volatile memory is divided into a plurality of logical areas, and wherein the controller checks presence or absence of a failure for each of the plurality of logical areas using an interruption by a timer or communication from the electronic control unit as a trigger, and if it is determined as a result of the checking that there is a failure, performs predetermined processing corresponding to the failure.

4. The on-board secure storage system as claimed in claim 2, wherein the predetermined processing corresponding to the unauthorized access and the predetermined processing corresponding to the failure include notification to the electronic control unit.

5. The on-board secure storage system as claimed in claim 1, wherein the unauthorized access is access area violation, and wherein predetermined processing corresponding to the unauthorized access includes prohibiting all access from the electronic control unit.

6. The on-board secure storage system as claimed in claim 1, wherein the unauthorized access is access mode violation, and wherein predetermined processing corresponding to the unauthorized access includes prohibiting an operation corresponding to an access mode.

7. The on-board secure storage system as claimed in claim 1, wherein the unauthorized access is unauthorized data alteration, and wherein predetermined processing corresponding to the unauthorized access includes protecting current data on the non-volatile memory, notifying the electronic control unit of occurrence of the unauthorized access, and requesting the electronic control unit to recheck data.

8. The on-board secure storage system as claimed in claim 1, wherein the unauthorized access is unauthorized writing, and wherein predetermined processing corresponding to the unauthorized access includes assigning a reference sign to written data, setting an area in which the data is written as a read-only area, and setting the area as the read-only area until a cancellation command is issued from a host later.

9. The on-board secure storage system as claimed in claim 1, wherein, when out-of-area write access occurs and information indicating whether or not another area is addable as a writable area at a time of access by out-of-area write access indicates that the another area is addable, the unauthorized access is out-of-area write access, and wherein predetermined processing corresponding to the unauthorized access includes automatically securing a new area in the non-volatile memory and adding the new area as a continuous area.

10. The on-board secure storage system as claimed in claim 1, wherein the unauthorized access is successive access mode violation, and wherein predetermined processing corresponding to the unauthorized access includes temporarily canceling a read-only mode, enabling writing until predetermined data is written to a predetermined address, and returning the mode to the read-only mode when the predetermined data is written to the predetermined address.

11. The on-board secure storage system as claimed in claim 1, wherein the unauthorized access is unauthorized access to an area for autonomous driving, and wherein predetermined processing corresponding to the unauthorized access include invalidating a part or all of the area for autonomous driving, or performing processing of stopping or partially limiting a function of an autonomous driving, and further notifying a host of stoppage of the autonomous driving or partial limitation of the function.

12. The on-board secure storage system as claimed in claim 3, wherein a type of the failure is any of detection of a fatal fault that is a fault in which it is determined that automatic recovery in the on-board secure storage system is impossible, detection of an area abnormality, and detection of a fault related to a specific area related to a specific function of the non-volatile memory among the fatal faults.

13. The on-board secure storage system as claimed in claim 12, wherein the failure is detection of the fatal fault, and wherein predetermined processing corresponding to the failure includes completely or partially interrupting access from a host to the non-volatile memory.

14. The on-board secure storage system as claimed in claim 12, wherein the failure is detection of the area abnormality, and wherein predetermined processing corresponding to the failure includes switching to a backup area of the corresponding area.

15. The on-board secure storage system as claimed in claim 12, wherein the failure is detection of the fault related to the specific area related to the specific function of the non-volatile memory among the fatal faults, and wherein predetermined processing corresponding to the failure includes requesting the electronic control unit to notify an external service center by external communication.

16. The on-board secure storage system as claimed in claim 4, wherein the electronic control unit is connected to a monitor, and wherein, upon receiving the notification, the electronic control unit displays a caution or a warning on a screen of the monitor.

17. The on-board secure storage system as claimed in claim 4, wherein the electronic control unit is connected to a speaker and a microphone, and wherein, upon receiving the notification, the electronic control unit causes the speaker to vocalize information related to a caution or a warning, and accepts an input by voice via the microphone.

18. The on-board secure storage system as claimed in claim 4, wherein the electronic control unit is connected to a room lamp, and wherein, upon receiving the notification, the electronic control unit performs blinking, color change, or brightness change of the room lamp.

* * * * *